L. W. BUGBEE.
PROCESS OF FORMING OPHTHALMIC LENSES.
APPLICATION FILED MAY 29, 1914.
1,153,859.  Patented Sept. 14, 1915.
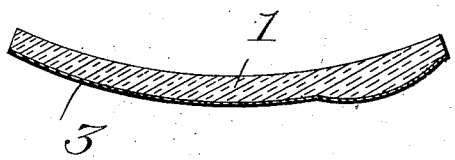
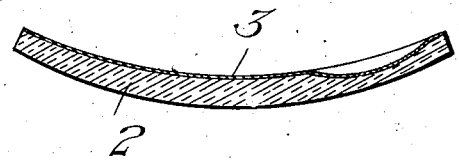
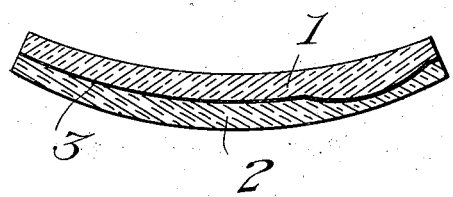
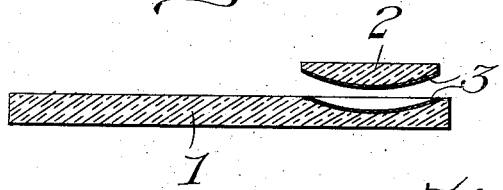
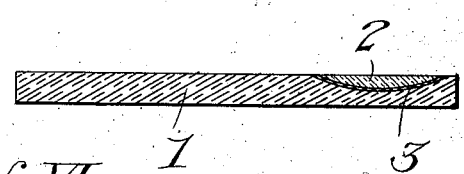
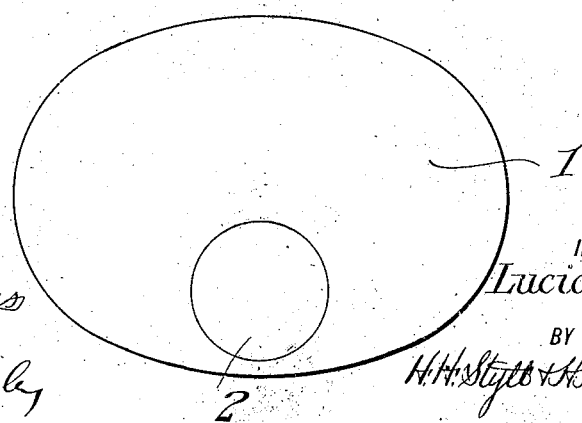
WITNESSES:
INVENTOR
Lucian W. Bugbee,
BY
H. H. Stytt & H. K. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION.

PROCESS OF FORMING OPHTHALMIC LENSES.

1,153,859.   Specification of Letters Patent.   Patented Sept. 14, 1915.

Application filed May 29, 1914. Serial No. 841,944.

*To all whom it may concern:*

Be it known that I, LUCIAN W. BUGBEE, a citizen of the United States, residing at Southbridge, in the county of Worcester and State of Massachusetts, have invented certain new and useful Improvements in Processes of Forming Ophthalmic Lenses, of which the following is a specification.

My invention relates to improvements in ophthalmic lenses and has particular reference to those forms of lenses formed from two or more pieces of glass.

The leading object of my invention is the provision of an improved process by which the said separate pieces of the lens may be readily and satisfactorily united.

A further object of my invention is the provision of an improved process of so uniting the lenses that there will be no bubbles or other defects present in the finished article, and yet having the parts so connected that while held against accidental loosening they may be readily separated when desired.

Other objects and advantages of my improvement should be readily apparent by reference to the following specification, taken in connection with the accompanying drawings, and it will be understood that I may make any variation from the specific step hereinafter mentioned within the scope of the appended claim without departing from or exceeding the spirit of my invention.

In the drawings: Figure I is a sectional view through one part of a lens which has been treated by my improved process. Fig. II is a similar sectional view through the other part of the lens. Fig. III is a sectional view through the two parts after they have been joined by the improved process. Fig. IV is a sectional view through a lens blank and wafer before the same are united after having been initially treated by the improved process. Fig. V is a similar view through the blanks after having been united. Fig. VI is a face view of a completed lens.

As previously stated, my invention relates to an improved process of uniting portions of an ophthalmic lens and is applicable for use with any form of compound lens although more particularly designed and especially applicable in the formation of bifocal lenses comprising a major portion and a segment or segments secured thereto.

Hitherto in the formation of lenses of this nature but two satisfactory methods have been found, the one consisting in employing a suitable cement which might be employed to stick the parts together, and the other consisting in placing the parts in contact and then heating the same until they were fused. Both of these prior art forms embody certain disadvantages, in that with the cemented form washing the lenses in hot water, or in some instances even the heat of the body would prove sufficient to loosen the wafer or segment portion when the same was liable to fall off. On the other hand, with the fused type of lenses the original expense of construction is considerable, since the blank must be especially fused with care and then ground on both sides to the correct curve. One of the great disadvantages here present is that the segment and major portions of the lens are inseparably united. Consequently should any correction however slight be required in the lens it is necessary to replace the entire lens rather than replace only the segment should the defect be in the reading portion of the lens. My improved process eliminates both of these difficulties and provides for the ready construction or formation of an ophthalmic lens in which the two parts will be firmly and securely held together under all service conditions, but in which it is possible to separate the various parts when desired.

In the employment of my process I take the parts 1 and 2 which are to be united and after suitably cleaning and preparing the same preferably heat them and while hot apply thereto a coating of a suitable securing material 3, such as a borate or silicate compound, which will become liquid or plastic only at a high temperature, but which at the same time will melt or fuse at a considerably lower temperature than that at which the parts to be united will become plastic.

While I have mentioned here that I may use a borate or silicate compound, it will be understood that I do not wish to be limited to a connecting medium embodying these general characteristics since a very soft glass having a low melting point may be used, and fused carbonate and certain chlorids or sulfids may be made use of and all will serve to satisfactorily and securely hold the parts, the particular material employed for this purpose, therefore, not being the essential part of this invention.

Upon the raising of the temperature of the connecting or joining material to the required point to render the same plastic or liquid, certain reaction necessarily takes place. I, therefore, hold the parts to be united and the connecting material at the temperature necessary to keep the connecting material in a liquid or plastic state, until the reaction has apparently ceased; after which I place the parts into contact with each other and press them firmly together. This pressing together serves to expel any air or bubbles which might otherwise collect between the parts while the keeping of the same separate and under heat until the reaction of the connecting material is completed serves to prevent any undesirable crystallization or reactionary effect upon placing of the parts together with the material therebetween, the result being that the material will unite with the surfaces to be joined and will securely hold the same together. The parts having been thus united I then anneal the completed blank in a suitable manner, after which it is ready for finishing into the completed lens.

To separate the parts it is merely necessary to again re-heat the same to that temperature which will serve to soften the connecting medium between the parts when they may be readily separated without injury to either and a new part substituted for either of the others which is unsatisfactory in any particular.

From the foregoing description it will be understood by those conversant with the art that by my new and improved process I am able to satisfactorily unite the parts of an ophthalmic lens in a most satisfactory manner while reducing to a minimum the liability of defects or errors in the lens on account of the manner of grinding the parts and also making it possible to separate the parts when desired while preventing accidental separation thereof.

I claim:

The process of forming an ophthalmic lens blank consisting in coating the two parts thereof with a suitable uniting medium whose fusing point is lower than that of the said parts, heating the parts to the fusing point of said connecting medium, continuing the heating action until the completion of the reaction of the connecting medium, placing the parts with the coated portions thereof in close engagement, and annealing the completed blank.

In testimony whereof I affix my signature in presence of two witnesses.

LUCIAN W. BUGBEE.

Witnesses:
JOSEPH J. DEMERS,
H. K. PARSONS.